(12) United States Patent
Gnanasekaran et al.

(10) Patent No.: US 11,997,008 B1
(45) Date of Patent: May 28, 2024

(54) NON-DISRUPTIVE ROUTE CHANGE IN FIBRE CHANNEL NETWORK

(71) Applicant: Avago Technologies International Sales Pte. Limited, Singapore (SG)

(72) Inventors: Sathish K Gnanasekaran, Bangalore (IN); Badrinath Kollu, San Jose, CA (US); Kung-Ling Ko, San Jose, CA (US); Chao Zhang, Sunnyvale, CA (US); Li Zhao, San Jose, CA (US); Pushpanathan Chidambaram, San Jose, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/103,941

(22) Filed: Jan. 31, 2023

(51) Int. Cl.
*H04L 45/00* (2022.01)

(52) U.S. Cl.
CPC .............. *H04L 45/22* (2013.01); *H04L 45/54* (2013.01); *H04L 45/566* (2013.01)

(58) Field of Classification Search
CPC ........ H04L 45/22; H04L 45/54; H04L 45/566
USPC ....................................................... 709/224
See application file for complete search history.

(56) References Cited

U.S. PATENT DOCUMENTS

| | | | |
|---|---|---|---|
| 2011/0243146 A1* | 10/2011 | Armstrong ............ | H04L 45/586 370/401 |
| 2017/0237767 A1* | 8/2017 | George ............... | H04L 63/1416 726/23 |
| 2018/0270203 A1* | 9/2018 | Zhao ..................... | H04L 63/029 |
| 2018/0351882 A1* | 12/2018 | Jeganathan ......... | H04L 12/4641 |
| 2019/0124407 A1* | 4/2019 | Shen ................... | H04N 21/6118 |
| 2022/0224776 A1* | 7/2022 | Doshi ................ | H04L 43/0852 |
| 2023/0096468 A1* | 3/2023 | Ong ....................... | H04L 47/283 370/235 |
| 2023/0134128 A1* | 5/2023 | Han ....................... | G06F 3/061 711/154 |
| 2023/0185467 A1* | 6/2023 | Mallick ................ | G06F 3/0607 711/154 |

* cited by examiner

*Primary Examiner* — Karen C Tang
(74) *Attorney, Agent, or Firm* — Foley & Lardner LLP (57) ABSTRACT

A system and method for non-disruptive route change. The method includes receiving a first data transmission frame associated with a first exchange at a switch, transmitting the first data transmission frame through a first route based on a route lookup, determining, by a traffic optimization circuit, an improved second route, determining if the first exchange includes any other data transmission frames, and transmitting a first data transmission frame associated with a second exchange through the second route in response to determining that the first exchange does not include any other data transmission frames.

20 Claims, 5 Drawing Sheets

NON-DISRUPTIVE ROUTE CHANGE IN FIBRE CHANNEL NETWORK

FIELD OF THE DISCLOSURE

This disclosure generally relates to computer networking, storage networking and communications. Some embodiments of the present disclosure are related to systems and methods for non-disruptive route change in a fibre channel network.

BACKGROUND

This disclosure is directed towards network communications devices. Digital switching techniques have facilitated the large scale deployment of affordable, easy-to-use communication networks including storage networks (e.g., storage area networks (SANs)). Wireless communication may operate in accordance with various standards such as IEEE 802.11x, IEEE 802.11ad, IEEE 802.11ac, IEEE 802.11n, IEEE 802.11ah, IEEE 802.11aj, IEEE 802.16 and 802.16a, Bluetooth, global system for mobile communications (GSM), code division multiple access (CDMA), satellite technologies and cellular technologies.

SANs connect computer data storage to servers in commercial data centers. SANs can use a Fibre Channel (FC) protocol which is a high-speed data transfer protocol providing in-order, lossless delivery of raw block data. When a network node or link is carrying more data than it can handle, that link creates congestion in the network resulting in overall reduced network throughput (e.g., for other fabric devices, such as, fibre channel host bus adapters (HBAs) or storage adapters, Ethernet converged network adapters (CNA), security adapters, or other communication devices). Standards can provide protocols for reducing or preventing congestion on the network

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The following IEEE standard(s), including any draft versions of such standard(s), are hereby incorporated herein by reference in their entirety and are made part of the present disclosure for all purposes IEEE 802.3, IEEE 802.11x, IEEE 802.11ad, IEEE 802.11ah, IEEE 802.11aj, IEEE 802.16 and 802.16a, and IEEE 802.11ac. In addition, although this disclosure may reference aspects of these standard(s), the disclosure is in no way limited by these standard(s). Some standards may relate to storage area networks (SANs) for connecting computer data storage to servers in commercial data centers. SANs can use a Fibre Channel (FC) standard/protocol, small computer system interface (SCSI) interface standard/protocol, asynchronous transfer mode (ATM) protocol, and synchronous optical networking protocol (SONET), all of which are incorporated herein by reference in their entireties.

For purposes of reading the description of the various embodiments below, the following descriptions of the sections of the specification and their respective contents may be helpful. Section A describes a network environment and computing environment which may use data from fibre channel networks or SANs practicing embodiments described herein, and Section B describes embodiments of systems for and method for non-disruptive route change in a fibre channel network. Some embodiments of the systems and methods can utilize exchange rate-limiting in a network without blocking. Some embodiments achieve advantages of reduced traffic congestion in the network, improved overall throughput in the system, reduced CPU utilization without requiring host CPU/software/driver intervention, and reduced impacts of speed mismatches in the network.

Various embodiments disclosed herein are related to systems and methods for non-disruptive route change within fibre channel networks. It may be desired that fibre channel networks provide in-order data frame delivery to ensure high performance data transfer. Some fibre channel communication networks avoid out-of-order data frame delivery by pausing data transmission for a period of time in order to switch data communication routes. A data communication route may be defined as a specific direction or flow of information (e.g., data transmission frames) from one port to another, in some embodiments. A data transmission frame (sometimes referred to as a data frame herein) may refer to a unit of data which includes identification for the data and determines how the data should be decoded and interpreted. This disruption in data transmission may slow down communication in the fibre network channel leading to slower and less efficient communication which may not be desired. Therefore, systems and methods provide non-disruptive route change in a fibre channel network in some embodiments.

Some embodiments described herein provide a method for non-disruptive route change which allows numerous routes to be changed simultaneously without any pauses in data transmission or frame drops. Therefore, traffic optimization can be performed in a non-intrusive way which allows data transmission to continue while a data transmission route is changed. In some embodiments, the fibre channel network system may include one or more switches which facilitate data transmission and network traffic optimization. In some embodiments, the switches may include a transmission controller which may be configured to continuously monitor network traffic flow and network state. Based on the monitored network traffic, the transmission controller may determine a better data communication route and install the new data communication route on the switch instantaneously without any traffic disruption.

Within a fibre channel communication network, data frames may move from switch to switch and/or from storage to server along one or more paths which make up a data communication route. Routing policies may determine the path for each frame of data. Before the fibre channel communication network system can begin routing network traffic, the system determines the route that the data frame should take to reach an intended destination. In some embodiments, the fibre channel communication network determines the route the data frame should take based on routing policy selected and implemented on the switch. A switch may refer to a network component which connects network devices (such as computers, wireless access points, etc.) in a network to each other, and allows them to exchanging data transmission frames, in some embodiments. In some embodiments, the fibre channel network system may implement an "exchange-based routing" policy for data frame delivery. Exchange-based routing only requires in-order frame delivery within "exchanges" in some embodiments. An exchange may refer to a unit of protocol activity that transfers information (e.g., data frames) between a specific originator or initiator port and specific receiver port using one or more related non-concurrent sequences that may flow in the same or opposite direction in some embodiments. An originator port may be defined as an origination location for a data transfer and a receiver port may be defined as a destination location for a data transfer in some embodiments. A unit of protocol activity may be defined as a standardized data transmission activity within a fibre channel communication network in some embodiments. A non-concurrent sequence may be defined as a sequence which does not occur at the same time in some embodiments. In some embodiments, an exchange may last anywhere between a few millisecond to a few seconds. When the transmission controller finds a new and improved data communication route, the frames being transmitted within the current active exchange finish transmitting on the current route until the exchange is complete in some embodiments. In some embodiments, the data frames in the next exchange use the new and improved route within the systems and methods described herein. In some embodiments, the transmission controller may utilize the short time period (e.g., milliseconds) of an exchange to facilitate the route change so that no down time is required when changing routes leading to improved data transmission efficiency.

Some embodiments disclosed herein are directed to a coordinated data packet transmission system which includes a media access control (MAC) layer and a physical interface (PHY) layer which are configured to facilitate the transmission of data packs while avoiding collisions between data packets. The MAC layer may refer to a layer within the network which controls the hardware responsible for interaction with a wired, optical, or wireless transmission medium in some embodiments. The MAC layer is responsible for flow control and multiplexing for the transmission medium in some embodiments. The nodes on the transmission medium may monitor the traffic on the network, and when attempting to transmit data frames. The nodes may refer to connection points within a communication network. Each node can be an endpoint for data transmissions or redistribution. Nodes can perform data transmission, process recognition, packet switching, and network distribution and are configured to identify, process, and transmit data from one node to another in some embodiments. Nodes include but are not limited to a computer, printer, switch, user device, or router.

Nodes can be configured to recognize, process and forward transmissions to other network nodes. The MAC layer can be implemented by any circuit including a processor configured to provide communication flow control in some embodiments. The coordinated data packet transmission system uses a physical media dependent (PMD) transceiver with the ability to detect and report an idle state and collisions on the network in some embodiments. In some embodiments, the coordinated data packet transmission system receives and transmits arbitrary data packets using the modulation technique and data formats allowed at the PMD level.

Section A: Computing and Network Environment

Figure 1:
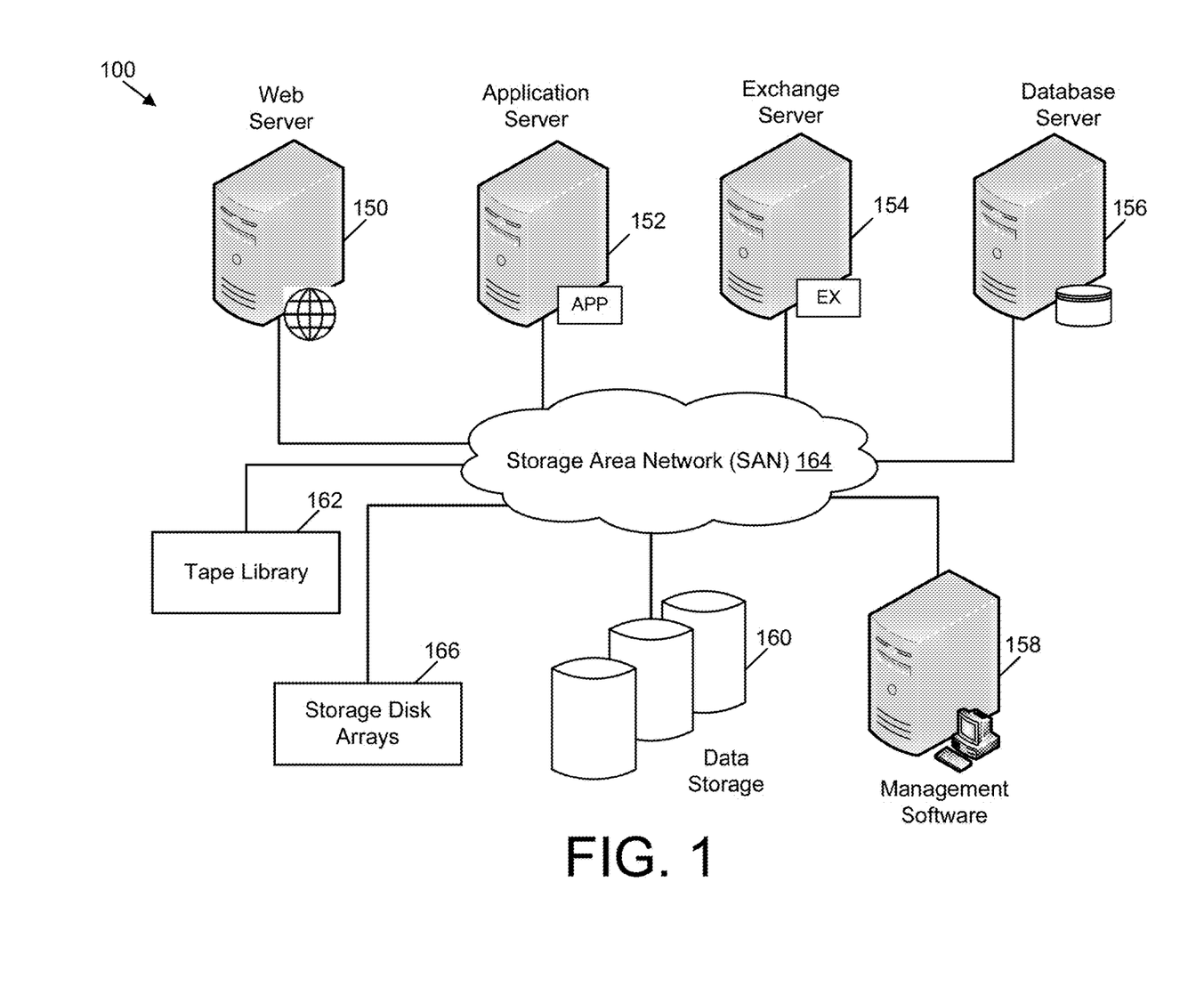
FIG. 1 is a schematic block diagram of a storage area network, in accordance with some embodiments FIG. 2 a schematic diagram of a communications network configured to use the non-disruptive route changing operations, in accordance with some embodiments.

Prior to discussing specific embodiments of the present solution, it may be helpful to describe aspects of the operating environment as well as associated system components (e.g., hardware elements) in connection with the methods and systems described herein. Prior to discussing specific embodiments of the present solution, it may be helpful to describe aspects of the operating environment as well as associated system components (e.g., hardware elements) in connection with the methods and systems described herein. FIG. 1 depicts a communication network environment 100. The communication network environment 100 may include storage area network (SAN) 164 which may be used to enable connectivity among multiple servers and internal/external independent storage resources. In some embodiments, the multiple servers may be connected and able to transfer data to and from the storage resources through switches with the storage area network. In some embodiments, communication network environment 100 may be a fibre channel network in which the multiple servers and storage resources may be connected through fibre optic cables.

The SAN 164 connects and facilitates communication and the transfer of data between one or more servers and one or more storage resources. In some embodiments, the one or more servers may include a web server 150, an application server 152, an exchange server 154, a database server 156, and a management software 158. Each of these servers may be configured to accomplish different tasks. For example, the web server 150 may be a computing device which includes software and hardware which provides a webpage and facilitates communication with the World Wide Web. The application server 152 may be a computing device which hosts applications and facilitates the delivery of the applications. The exchange server 154 may be a computing device which is configured to manage emails and calendars. The database server 156 may be configured to provide database services. In some embodiments, the data from the database server may be stored in data storage 160. In some embodiments, the management software 158 may include one or more control units which are configured to control operation of the storage area network. In some embodiments, the storage resources may include a tape library 162 which is a type of storage system which stores information on tape. In some embodiments, the tape library may include tape drives, tape autoloaders, and/or tape libraries. In some embodiments, the storage resources may also include storage disk arrays 166. A storage disk array may be defined as a storage system which includes multiple disk drives and a memory cache. In some embodiments, the storage disk array may include a controller with some intelligence (e.g., redundant array of independent disks (RAID)) which is configured to protect the data stored in the storage array.

In some embodiments, the connectivity within the SAN 164 consists of hardware and software components that interconnect storage devices (e.g., tape library 162, data storage 160, etc.) and servers including a fibre channel. The hardware can include hubs, switches, gateways, directors, and routers. The software may include the management software 158.

B: Systems and Methods for Non-Disruptive Route Change in a Fibre Channel Network With reference to FIG. 2, a fibre channel network system 200 includes a data transfer initiator 205 (such as servers 152, 154, and 156 described above), a switched network 210, and a data transfer receiver 215 (such as data storage 160 and tape library 162 described above). The fibre channel network system 200 is arranged as a fibre channel (FC) SAN in some embodiments. The fibre channel network system 200 can utilize link-level flow control and host CPU/software/drivers to limit the number of commands outstanding or to control the queue depth in some embodiments. In addition, host CPU/software/driver is configured to coordinate traffic between connections without affecting performance due to limits on CPU overhead in some embodiments.

Figure 2:
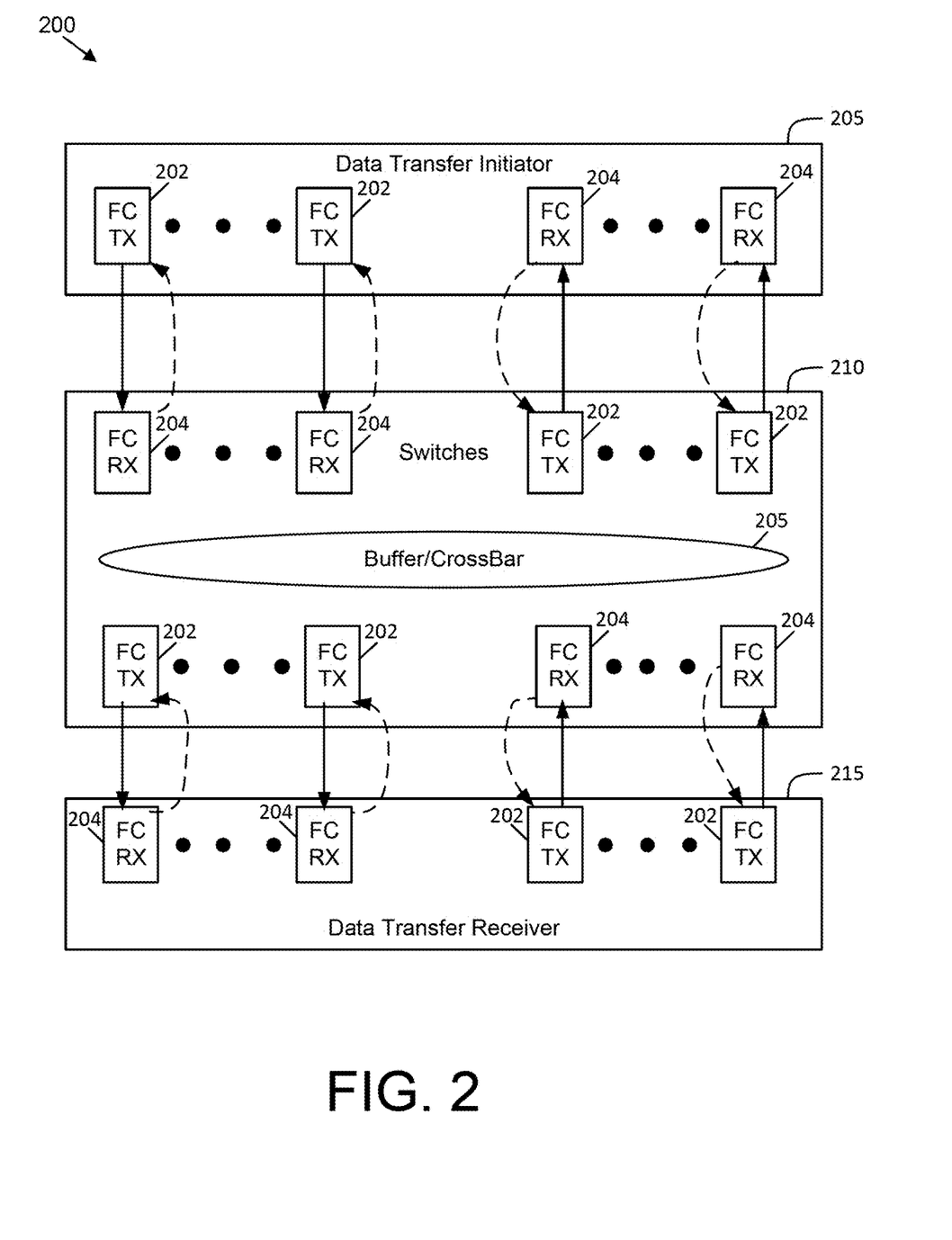

The fibre channel network system 200 can be utilized with the computing and communication components described above with respect to FIG. 1. For example, one or more of the web server 150, the application server 152, the exchange server 154, and the database server 156 can be the data transfer initiator 205 whereas the storage resources (e.g., tape library 162, storage disk arrays 166, data storage 160, etc.) may be the data transfer receiver 215. The fibre channel network system 200 is a high-speed network that connects data transfer initiator 205 to data transfer receiver 215 (e.g., a high-performance storage subsystem). The fibre channel network system 200 can access storage processors (SPs), and storage disk arrays in some embodiments. The fibre channel network system 200 can use FC protocol to package SCSI commands into FC frames in some embodiments. When transferring data between the data transfer initiator 205 and the data transfer receiver 215, the fibre channel network system 200 can utilize multi-pathing to provide more than one path or data communication route from the data transfer initiator 205 the data transfer receiver 215 via the switched network 210.

In some embodiments, the data transfer initiator 205 includes transmitter ports 202a-b and receiver ports 204a-b. Transmitter ports 202a-b and receiver ports 204a-b can be any number for 1 to N. The data transfer receiver 215 includes transmitter ports 218a-b and receiver ports 216a-b. Transmitter ports 218a-b and receiver ports 216a-b can be any number for 1 to N.

The switched network 210 includes receiver ports 206a-b, transmitter ports 208a-b, transmitter ports 212a-b, receiver ports 214a-b, and a buffer or cross bar switch 220. Transmitter ports 208a-b, transmitter ports 212a-b, receiver ports 206a-b and receiver ports 214a-b can be any number for 1 to N. Receiver ports 206a-b are in communication with transmitter ports 202a-b, and transmitter ports 208a-b are in communication with ports 204a-b. Transmitter ports 212a-b are in communication with receiver ports 206a-b via cross bar switch 220, and ports 214a-b are in communication with ports 208a-b via the cross bar switch 220. Ports 212a-b are in communication with ports 216a-b, and ports 214a-b are in communication with ports 218a-b. The switched network 210 is a fabric switched network, arbitrated loop network, or point-to-point network in some embodiments. Ports 206a-b, 208a-b, 212a-b, and 214a-b can be associated with servers, hubs, switches, routers, directors, nodes or other devices. The switched network 210 can include the physical layer, interconnect devices, and translation devices.

The buffer or cross bar switch 220 can be two unidirectional switches or a bidirectional switches configured to interconnect ports 206a-b with ports 212a-b and ports 208a-b with ports 214a-b. The cross bar switch 220 can include a matrix of switches and include buffers and other communication and interface circuitry. Each of ports 214a-b, 216a-b, 208a-b, 206a-b, 212a-b, 214a-b, 218a-b, and 216a-b can have a unique addressable identifier. Each of ports 214a-b, 216a-b, 208a-b, 206a-b, 212a-b, 214a-b, 218a-b, and 216a-b can be associated with a network node and a pair of ports 214a-b, 216a-b, 208a-b, 206a-b, 212a-b, 214a-b, 218a-b, and 216a-b can be associated with a network link.

In some embodiments, the switched network 210 may include a transmission controller (shown in FIG. 3) which may be configured to monitor the network traffic between the data transfer initiator 205 and the data transfer receiver 215 and optimize network traffic (e.g., the transmission of data frames) between the data transfer initiator 205 and the data transfer receiver 215. The transmission controller is described in more detail with respect to FIG. 4 below.

Figure 3:
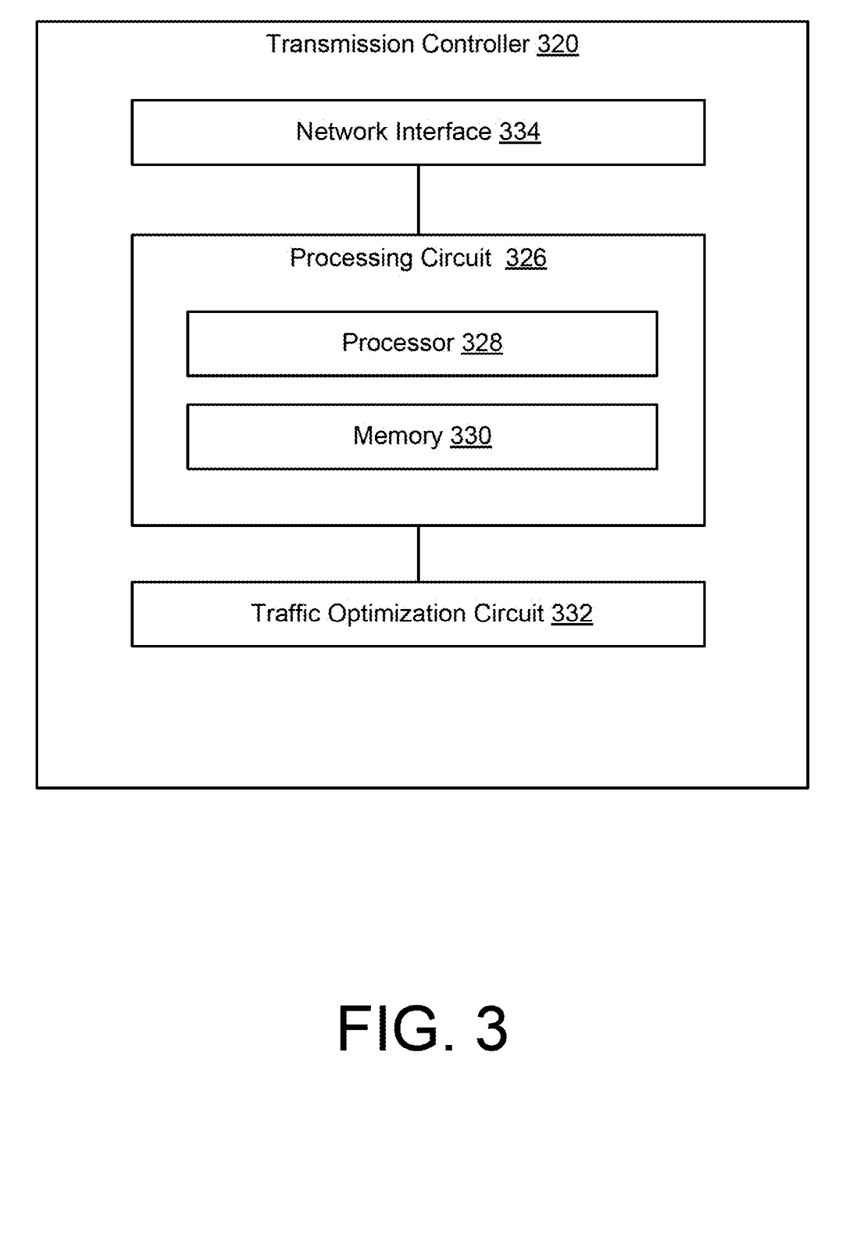
FIG. 3 is a schematic diagram of a transmission controller, in accordance with some embodiments.

Referring now to FIG. 3, a schematic diagram of the transmission controller 320 is shown in greater detail in accordance with an exemplary embodiment. The transmission controller 320 is configured to optimize network data traffic transmission by implementing non-disruptive route change. The transmission controller 320 may receive information including network traffic data and identifying information for each data exchange. The information may be used to evaluate a current data communication route, determine if a better data communication route is available for future use, and direct network traffic through the better data communication route without disrupting data transmission thereby optimizing data transmission. In some embodiments, the controller 320 includes a network interface 334, processing circuit 326, and a traffic optimization circuit 332. The processing circuit 326 includes a processor 328 and a memory 330. Processing circuit 326 is any circuitry or components that can perform logic and communication processing for the transmission controller 320.

In some embodiments, the processing circuit 326 is implemented as a field-programmable gate array, an application-specific integrated circuit, hardware, a software executing processor, or state machines. In some embodiments, the processing circuit 326 is part of layers (e.g., MAC, network, PHY layers) of IEEE 802.11 standard devices. The processing circuit 326 can be configured to perform communication operations, non-primary channel utilization and setup therefor, channel selection, frame building and processing, association operations, authorization operations, connection setup, disassociation operations, and de-authentication operations in some embodiments. Instructions for the processing circuit 326 can be stored in a non-transitory medium such as memory 330 in some embodiments.

The memory 330 may be one or more devices (e.g., RAM, ROM, Flash memory, hard disk storage) for storing data and/or computer code for completing and/or facilitating the various processes described herein. The memory 330 may be or include non-transient volatile memory, non-volatile memory, and non-transitory computer storage media. The memory 330 may include database components, object code components, script components, or any other type of information structure for supporting the various activities and information structures described herein. The memory 330 may be communicably coupled to the processor 328 and include computer code or instructions for executing one or more processes described herein. The processor 328 may be implemented as one or more application specific integrated circuits (ASICs), hardware, field programmable gate arrays (FPGAs), a group of processing components, and a software executing processor, state machines or other suitable electronic processing components. As such, the transmission controller 320 is configured to run a variety of control circuits and/or programs and store associated data in a database of the memory 330. The circuits (e.g., traffic optimization circuit 332) can be implemented in AP software (e.g., MAC layer or PHY layer software) or STA software (e.g., MAC layer or PHY layer software).

In some embodiments, the network interface 334 is structured and used to establish connections with other computing systems and devices (e.g., servers 150, 152, 154, and 156 and storage resources such tape library 162, storage disk arrays 166, data storage 160 (FIG. 1) via a network (e.g., SAN 164, WAN connection, LAN connection, WLAN connection, etc.). The network interface 334 includes program logic that facilitates connection of the transmission controller 320 to the network connections. For example, the network interface 334 may include any combination of a wireless network transceiver (e.g., a cellular modem, a Bluetooth transceiver, a Wi-Fi transceiver, transmitter 242, etc.) and/or a wired network transceiver (e.g., an Ethernet transceiver). In some arrangements, the network interface 334 includes the hardware (e.g., processor, memory, and so on) and machine-readable media sufficient to support communication over multiple channels of data communication. A network interface or network interface circuit may refer to any circuit or circuitry (with or without software) configured to establish connections with other computing systems. The network interface 334 can include a physical layer circuitry necessary for communicating with a data link layer standard, such as Ethernet or Wi-Fi. The circuit can prepare and control the flow of data on the network.

The traffic optimization circuit 332 is configured to optimize data transmission by implementing non-disruptive route change within a data transmission network without having to pause data transmission or dropping any data frames. Therefore, the traffic optimization circuit 332 facilitates network traffic optimization in a non-intrusive way which allows data transmission to continue while a data transmission route is changed. In some embodiments, the fibre channel network system 200 includes one or more switches or nodes which facilitate data transmission and network traffic optimization. In some embodiments, the switches (e.g., the switched network 210) may include a transmission controller which may be configured to continuously monitor network traffic flow and network state. In other embodiments, the transmission controller 320 may be located in another location within the fibre channel network system 200. Based on the monitored network traffic, the transmission controller 320 may determine a better data communication route and install the new data communication route on the switch instantaneously without any traffic disruption.

Within the fibre channel network system 200, data frames may move from switch to switch and/or from storage to server along one or more paths which make up a data communication route. For example, data frames may move between the data transfer initiator 205 and the data transfer receiver 215 in some embodiments. Routing policies may determine the path for each frame of data. Before the fibre channel network system 200 can begin routing network traffic, the system 200 determines the route that the data frame should take to reach an intended destination. Specifically, the transmission controller 320 within the fibre channel network system may manage routing the network traffic. In some embodiments, the transmission controller 320 determines the route the data frame should take based on routing policy selected and implemented on the switched network 210. In some embodiments, an "exchange-based routing" policy for data frame delivery may be implemented by the transmission controller 320. Exchange-based routing only requires in-order frame delivery within "exchanges" in some embodiments. An "exchange" may refer to a unit of protocol activity that transfers information between a specific originator or initiator port and specific receiver port using one or more related non-concurrent sequences that may flow in the same or opposite direction in some embodiments. When the transmission controller 320 finds a new and improved data communication route, the frames being transmitted within the current active exchange will finish transmitting on the current route till the exchange is complete. After the transmission controller 320 determines that all the data frames in the current exchange are done being transmitted, the transmission controller 320 starts transmitting the next exchange on the new and improved data transmission route. In some embodiments, the transmission controller 320 utilizes the short time period (e.g., milliseconds) of an exchange to facilitate the route change so that no down time is required when changing routes leading to improved data transmission efficiency.

In some embodiments, the transmission controller 320 receives identifying information for each exchange so that an exchange instance can be created upon the first frame delivered within the exchange. This allows the transmission controller 320 to keep track of which exchange is currently being transmitted. In some embodiments, the transmission controller 320 may utilize the exchange instance to keep track of route lookup results or the exchange. An exchange state instance may be defined as an iteration of an exchange which includes information pertaining to that particular exchange. For example, when the transmission controller 320 determines that an exchange with one or more data frames needs to be transmitted, the transmission controller 320 determines a data communication route by which to transmit the data exchange. This particular data communication route determined and assigned for the data exchange may be described as the route lookup. The route lookup may be stored in the exchange state learning instance. Any subsequent frames that are transmitted within the same data exchange and within the same direction must be transmitted using the same route as stored in the route lookup even if a new and improved route is found for the subsequent frames in some embodiments. In some embodiments, the exchange may be identified by one or more identifiers. The one or more identifiers may include a fabric identification which may be defined as an identifier which uniquely identifies each logical switch within a chassis and indicates to which fabric the logical switch belongs. In some embodiments, the one or more identifiers includes a destination identification which may be defined as an identifier which identifies a destination for the exchange in some embodiments. The destination may be described as groups of users or logical terminals into a single logical destination for the purpose of data routing. The one or more identifiers includes a source identification which may be defined as an identifier for specific source (e.g., port) of the exchange in some embodiments. The one or more identifiers may also include an exchange ID which may be defined as an identifier which identifies a particular exchange in some embodiments. The exchange state instance is removed after the transmission of all the data frames in the exchange are completed in some embodiments.

Figure 4:
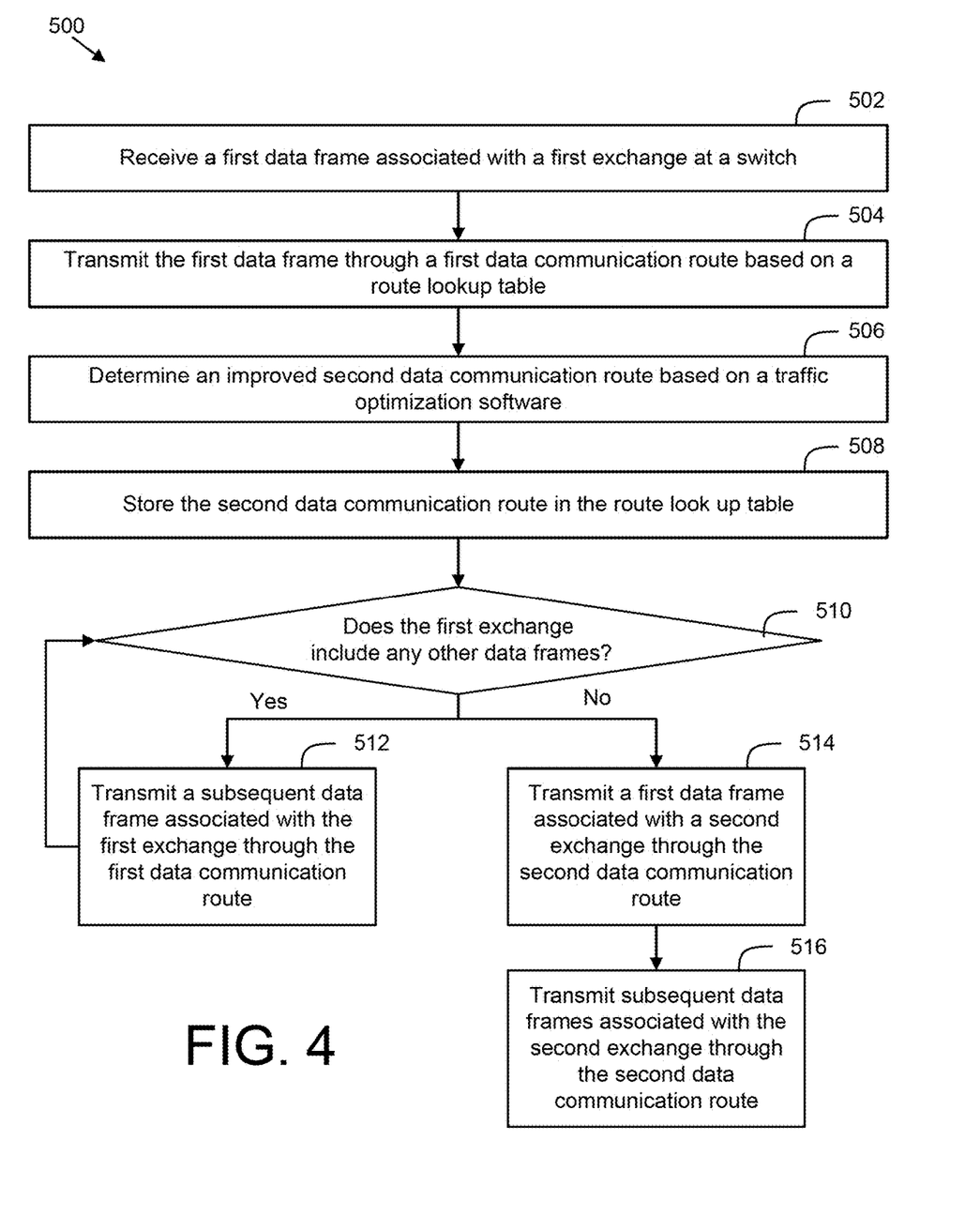
FIG. 4 is a schematic flow diagram of operations for non-disruptive route change in a fibre channel network, in accordance with some embodiments.

Referring now to FIG. 4, a flow for network traffic optimization by implementing non-disruptive route change is shown in accordance with an exemplary embodiment. The flow 500 may be implemented by the transmission controller 320. The process starts at operation 502. At operation 502, the transmission controller 320 receives a first data frame associated with a first exchange at a switch within the fibre channel network system 200. As explained above, an exchange may include one or more data frames to be transmitted through a fibre channel through on or more switches. Therefore, at operation 502, the transmission controller 320 may receive the first frame within a first exchange to be transmitted. In some embodiments, the transmission controller 320 creates a first exchange state instance at operation 502 once the first data transmission frame of the first exchange is received at the switch.

At operation 504, the transmission controller 320 transmits the first data transmission frame through a first data communication route based on the route lookup table. The route lookup table may be defined as a storage device (e.g., database, etc.) which stores information about one or more routes data can be transmitted between an initiator port and a receiver port in some embodiments. At operation 506, the transmission controller 320 determines an improved second data communication route based on a traffic optimization circuit 332. Specially, the traffic optimization circuit 332 receives network traffic data and determines which route has the highest bandwidth or can most efficiently transmit data frames within a data exchange. In some embodiments, the route which is determined to have the highest bandwidth may be different from the first route. Therefore, the transmission controller determines an improved second data communication route.

At operation 508, the transmission controller 320 stores the second data communication route determined at operation 506 in the route lookup table. At operation 510, the transmission controller 320 determines whether the first exchange still includes any other data frames which need to be transmitted. As explained above, when implementing an exchange-based routing policy, all the data frames within a single exchange will be transmitted using the same route. Therefore, if the first exchange still includes some data frames which need to be transmitted, the process proceed to operation 512. At operation 512, the transmission controller transmits a subsequent data frame associate with the first exchange through the first data communication route in accordance with the exchange-based policy. After, operation 512, the process returns to operation 510. If the first exchange does not include any more data frames which need to be transmitted, the process continues to operation 514. At operation 514, the transmission controller 320 transmits the first data frame associated with the second exchange through the second data communication route determined at operation 506. The transmission controller 320 continues to transmit any subsequent data frames associated with the second exchange through the second data communication route. The flow 500 continues to be implemented by the transmission controller 320 for any subsequent exchanges until the data frames for every change have been transmitted.

Figure 5:
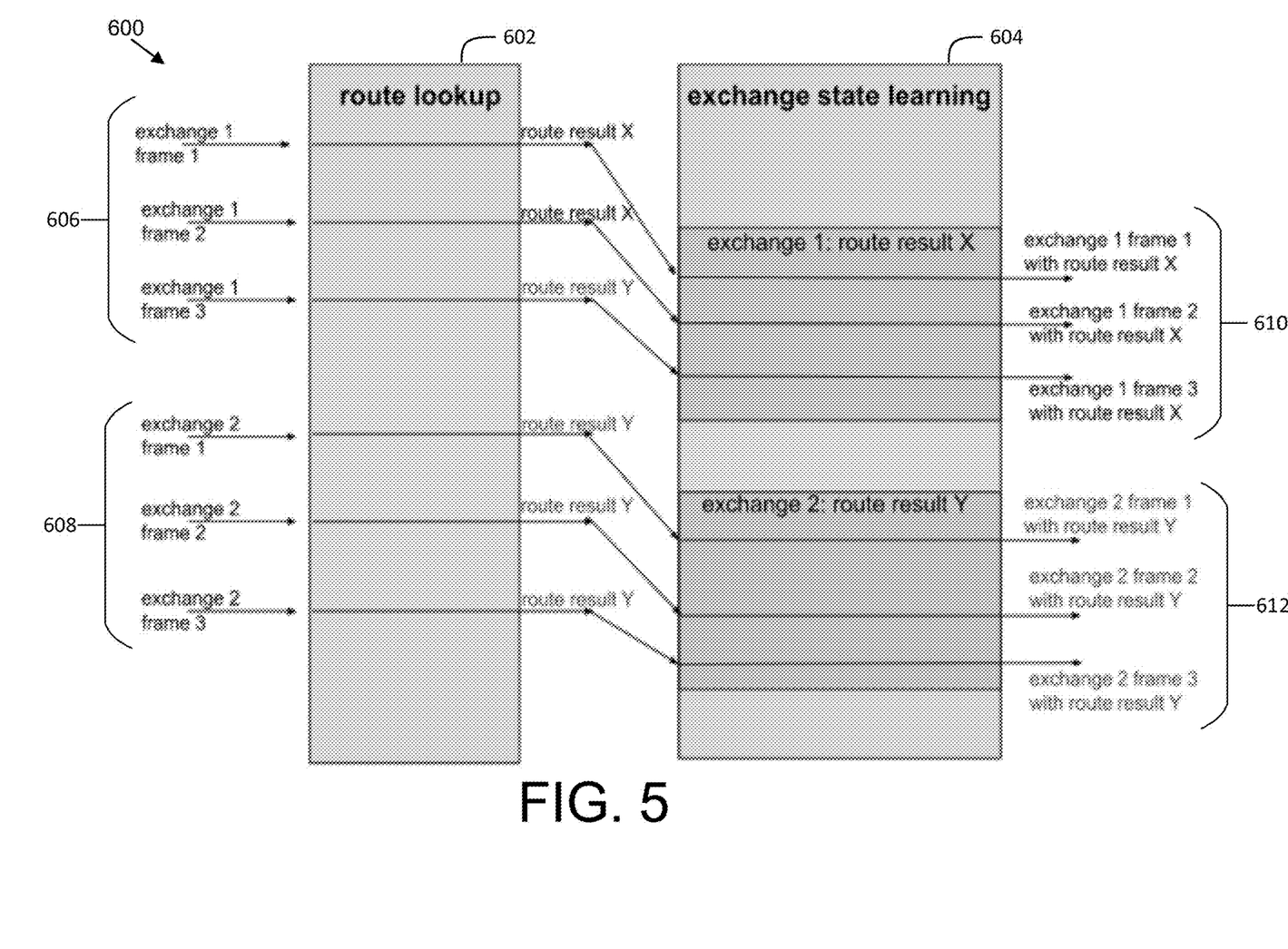
FIG. 5 is a schematic diagram of an exemplary implementation of operations for non-disruptive route change in a fibre channel network, in accordance with some embodiments.

Referring now to FIG. 5, a schematic diagram of an exemplary implementation 600 of the flow 500 is shown, according to an exemplary embodiment. The schematic diagram includes a route lookup table 602 and an exchange state learning table 604. The exchange state learning table may be configured to store the instance of the exchange (e.g., first exchange, second exchange, third exchange, etc.) and determine a correct data communication route based on the stored instance of the exchange. At portion 606, the data transmission controller begins transmitting the first exchange through a first data communication route "x." The first exchange includes 3 data frames in the exemplary implementation 600. During the transmission of the third frame, the data transmission controller 320 finds a better data transmission route "y." However, as shown in portion 610, the data transmission controller 320 transmits all three data frames through the first route "x." After the transmission of the first exchange, the data transmission controller 320 begins transmitting the second exchange at portion 608 of the exemplary implementation. Since a better and improved route was found during the transmission of the first exchange, the second exchange is transmitted through the second data communication route "y" as shown in portion 612 of the exemplary implementation.

The term "coupled" and variations thereof includes the joining of two members directly or indirectly to one another. The term "electrically coupled" and variations thereof includes the joining of two members directly or indirectly to one another through conductive materials (e.g., metal or copper traces). Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or optical.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities that can operate within a system or environment. It should be understood that the systems described above can provide multiple ones of any or each of those components and these components can be provided on either a stand-alone machine or, in some embodiments, on multiple machines in a distributed system. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C #, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A method for changing a data transmission route within a network, the method comprising:
   receiving a first data transmission frame associated with a first exchange at a switch;
   transmitting the first data transmission frame through a first route based on a route lookup table;
   determining, by a circuit, a second route during transmission of the first exchange;
   storing the second route in the route lookup table;
   determining if the first exchange includes any other data transmission frames; and
   transmitting a first data transmission frame associated with a second exchange through the second route in response to determining that the first exchange does not include any other data transmission frames.

2. The method of claim 1, the method further comprising transmitting a second data transmission frame associated with the first exchange through the first route in response to determining that the first exchange does include any other data transmission frames.

3. The method of claim 1, wherein the first exchange and the second exchange are units of protocol activity that transfers information between an originator port and a receiver port using one or more related non-concurrent sequences.

4. The method of claim 3, wherein the first exchange and the second exchange are identified by at least one of a fabric identification, a destination identification, a source identification, and an exchange identification.

5. The method of claim 1, wherein a first exchange state instance is created upon the switch receiving the first data transmission frame of the first exchange.

6. The method of claim 5, wherein the first exchange state instance stores the first route determined by the route lookup table.

7. The method of claim 6, wherein any subsequent data transmission frames associated with the first exchange must be transmitted through the first route stored in the first exchange state instance.

8. A controller for transmitting data frames, the controller comprising one or more processors and memory storing instructions that, when executed by the one or more processors causes the one or more processors to perform operations comprising:
   receiving a first data transmission frame associated with a first exchange at a switch;
   transmitting the first data transmission frame through a first route based on a route lookup table;
   determining, by a circuit, a second route during transmission of the first exchange;
   storing the second route in the route lookup table;
   determining if the first exchange includes any other data transmission frames; and
   transmitting a first data transmission frame associated with a second exchange through the second route in response to determining that the first exchange does not include any other data transmission frames.

9. The transmission controller of claim 8, wherein the operations further comprises transmitting a second data transmission frame associated with the first exchange through the first route in response to determining that the first exchange does include any other data transmission frames.

10. The transmission controller of claim 8, wherein the first exchange and the second exchange are units of protocol activity that transfers information between an originator port and a receiver port using one or more related non-concurrent sequences.

11. The transmission controller of claim 10, wherein the first exchange and the second exchange are identified by at least one of a fabric identification, a destination identification, a source identification, and an exchange identification.

12. The transmission controller of claim 8, wherein a first exchange state instance is created upon the switch receiving the first data transmission frame of the first exchange.

13. The transmission controller of claim 12, wherein the first exchange state instance stores the first route determined by the route lookup table.

14. The transmission controller of claim 13, wherein any subsequent data transmission frames associated with the first exchange must be transmitted through the first route stored in the first exchange state instance.

15. A storage area network switch for data transmission, the storage area network switch comprising:
   a transmission controller configured to:
      receive a first data transmission frame associated with a first exchange at a switch;
      transmit the first data transmission frame through a first route based on a route lookup table;
      determine a second route during transmission of the first exchange;
      store the second route in the route lookup table;
      determine if the first exchange includes any other data transmission frames; and
      transmit a first data transmission frame associated with a second exchange through the second route in response to determining that the first exchange does not include any other data transmission frames.

16. The storage area network switch of claim 15, wherein the transmission controller is configured to transmit a second data transmission frame associated with the first exchange through the first route in response to determining that the first exchange does include any other data transmission frames.

17. The storage area network switch of claim 15, wherein the first exchange and the second exchange are units of protocol activity that transfers information between an originator port and a receiver port using one or more related non-concurrent sequences.

18. The storage area network switch of claim 17, wherein the first exchange and the second exchange are identified by at least one of a fabric identification, a destination identification, a source identification, and an exchange identification.

19. The storage area network switch of claim 15, wherein a first exchange state instance is created upon the switch receiving the first data transmission frame of the first exchange.

20. The storage area network switch of claim 19, wherein the first exchange state instance stores the first route determined by the route lookup table.

\* \* \* \* \*